United States Patent [19]
Casillas

[11] Patent Number: 5,094,322
[45] Date of Patent: Mar. 10, 1992

[54] DOUBLE LEVER BRAKING SYSTEM

[76] Inventor: Linda M. Casillas, 12233 Folsom Blvd. Ste. 25, Rancho Cordova, Calif. 95442

[21] Appl. No.: 525,609

[22] Filed: May 21, 1990

[51] Int. Cl.[5] .................. B62L 1/06; B62L 3/00
[52] U.S. Cl. ...................... 188/24.22; 74/489; 74/551.8; 188/2 D; 188/24.11; 188/24.19; 188/24.12
[58] Field of Search ............... 188/24.11, 24.12, 24.13, 188/24.16, 24.18, 24.19, 24.21, 24.22, 2 D; 280/261, 279, 264, 288.4, 278; 74/489, 551.8, 501.6, 551.1, 551.9, 480 R, 480 B, 502.2, 502.4; D12/178, 179, 180

[56] References Cited

U.S. PATENT DOCUMENTS

| | | | |
|---|---|---|---|
| 3,719,104 | 3/1923 | Dian | 74/489 |
| 3,760,648 | 9/1973 | Hoffman | 188/24.11 X |
| 3,776,061 | 12/1973 | Kiyokazu | 74/489 X |
| 3,782,507 | 1/1974 | Shreve | 188/24.16 X |
| 3,803,937 | 4/1974 | Johnston | 74/489 |
| 3,835,724 | 9/1974 | Hoffman | 188/24.22 |
| 3,942,609 | 3/1976 | Hill | 188/24.16 |
| 3,977,270 | 8/1976 | Cristie | 74/489 X |
| 4,057,127 | 11/1977 | Woodring | 188/24.16 |
| 4,084,449 | 4/1978 | Kine | 74/480 |
| 4,462,267 | 7/1984 | Shimano | 74/489 |
| 4,480,720 | 11/1984 | Shimano | 188/24.16 |
| 4,653,768 | 3/1987 | Keys et al. | 188/24.22 |
| 4,770,435 | 9/1988 | Cristie | 188/24.12 |
| 4,773,509 | 9/1988 | Sato | 188/24.16 |
| 4,773,510 | 9/1988 | Sato | 188/24.16 |
| 4,811,620 | 3/1989 | Old et al. | 188/24.16 X |
| 4,862,762 | 9/1989 | Ross | 188/24.16 |
| 4,873,886 | 10/1989 | Renner | 74/551.8 |
| 4,878,397 | 11/1989 | Lennon | 74/551.8 X |
| 4,901,595 | 2/1990 | Ozaki et al. | 188/24.11 X |
| 4,930,798 | 6/1990 | Yamazaki et al. | 188/24.11 X |
| 4,951,525 | 8/1990 | Borromeo | 280/261 X |
| 5,000,469 | 3/1991 | Smith | 74/551.8 X |
| 5,005,674 | 4/1991 | Piatt | 188/24.22 X |

FOREIGN PATENT DOCUMENTS

| | | | |
|---|---|---|---|
| 648892 | 12/1928 | France | 188/24.12 |
| 412494 | 10/1946 | Italy | 188/24.12 |

OTHER PUBLICATIONS

T. Gear Aero-Brake ™, Triathlon Magazine, Apr. 1990, No. 77, p. 54.

Primary Examiner—Douglas C. Butler

[57] ABSTRACT

A double lever braking system that allows triathletes, cyclists and recreational riders the ability to control a bicycle equipped with an aerodynamic handlebar system through various situations while maintaining the aerodynamic riding position as well as in the upright stable riding position. The double lever braking system connects multiple brake levers to a common caliper type bicycle brake which allow human powered vehicles, where multiple extreme riding positions are desired, for improved performance and efficiency to be safe and controllable in various riding situations.

4 Claims, 7 Drawing Sheets

FIG 5 - DOUBLE LEVER BRAKE SYSTEM

FIG 6 - DOUBLE LEVER BARREL BRAKE SYSTEM

FIG 7- DOUBLE LEVER BRAKE ADAPTER SYSTEM

DOUBLE LEVER BRAKING SYSTEM

FIELD OF INVENTION

This invention relates to Aerodynamic handlebar systems of bicycles, specifically brake levers in the aerodynamic riding position of the said handlebars as well as the brake levers already existing in the upright stable position of these handlebars. These second set of brake levers in the aerodynamic hand position of aerodynamic handlebars allow the cyclist, triathlete or rider the ability to brake with their hands in the aerodynamic position of these aerodynamic handlebars.

BACKGROUND OF THE INVENTION

With the favorable aerodynamic benefits of the aerodynamic handlebar systems on bicycles, use of these bars has greatly increased despite the fact that these bars put the rider in many hazardous and unsafe conditions.

Currently, bicycles equipped with aerodynamic handlebar systems have several hand positions, a stable upright position and a forward aerodynamic position are the primary riding positions for cyclists/triathletes using this type of handlebar. The problem with this handlebar system is that in the forward aerodynamic position, where the athletes body weight is supported by his/her elbows, there is no easy, safe and assessable means to quickly slow or stop the moving vehicle, especially in unexpected emergency situations. However, should the rider decide to actuate the stable upright position brake levers (and not accidentally grab the lever for the front brake and end up flying over the handlebars anyway) while riding in the aerodynamic position during a unexpectant emergency situation, the likelihood of the rider maintaining control and avoiding becoming a victim of the unpredictable situation, is nearly impossible. Heretofore, the aerodynamic handlebar system offers no way for the rider to control the speed of these bicycles with his/her hands in the aerodynamic position of the aerodynamic handlebar systems as well as in the upright stable position.

Because the rider in the aerodynamic position is primarily supported by his/her elbows in a location where normally a riders hands would be positioned before the aerodynamic handlebar came into existence, the riders center of gravity is much closer to the front wheel of the bicycle and as a result the rider is in an extremely unstable position. Furthermore, because the rider now must maneuver the bicycle with these type of handlebars pressing his/her elbows into the outer raised portions of the elbow rests the rider is in an even more dangerous riding situation. Minor bumps in the road can easily knock the riders elbows off of the elbow rests (this is another problem with the use of the aerodynamic handlebar system). The primary problem my invention solves is the ability for the rider, to quickly and when desired, to actuate the brakes of a bicycle equipped with an aerodynamic handlebar system while riding in the aerodynamic position. With the the consideration of the rider in this unstable position and the impaired access to the brake levers, the need for the rider to safely reduce the speed or stop the bicycle when necessary and maintain control over the bicycle while in the aerodynamic position is imperative for many reasons: liability issues in regards to race and ride directors and coordinators, for the safety of the aerodynamic handlebar system user and for those people and environment around the aerodynamic handlebar user.

For the reasons stated above my double lever brake systems primary object is to allow the rider safe braking ability while in the aerodynamic position as well as in the upright stable position.

DESCRIPTION OF RELATED/PRIOR ART

Some triathletes have tried to remedy their brake leverless aerodynamic hand position by moving one of their brakelevers from the upright stable position to the aerodynamic position. Unfortunately the rider is unable to brake safely or effectively in emergency situations with both brake levers in these off-set positions on the aerodynamic handlebars.

Forms of double lever brake actuation systems for bicycles equipped with aerodynamic handlebar systems have been seen, such as a hydraulic double lever braking system (inventor name unknown, Anaheim Inter-Bike Expo, October 1989) or a brake splitter system(inventor name not known, advertisment in Triathlete magazine, April 1990). However these systems are either heavy, expensive and complicated or the cable connection is not adequately safe and lever retraction is weak and inefficient.

Patented prior art most relevant to my invention, such as U.S. Pat. Nos. 4,862,762, 3,803,937, 3,835,724 or 4,084,449 (Old et al, 1987, Johnston, 1972, Hoffman, 1973, Kine, 1976) have multiple braking means for various riding positions however they are only applicable to a particular handlebar configuration. This invention is applicable to many handlebar configurations as well as to many different types of human powered vehicles associated with several riding positions.

Other relevant brake and levers systems, U.S. Pat. Nos. 4,480,720, 4,773,510, 4,057,127 (Shimano, 1982, Sato, 1987, Woodring, (1975) were the exact opposite in configuration to my braking system, multiple brakes actuated by a common lever. This is opposite to my system of double levers actuating a common brake. Furthermore the purpose behind those patents is quite different than my invention which concern braking power or the need to reduce the possibility of riders accidentally actuating the front brake before applying the rear brake and possibly going over the handlebars.

OBJECTS AND ADVANTAGES

Accordingly, several objects and advantages of my invention are:

(a.) a means to allow the aerodynamic handlebar system user to control the speed of a bicycle equipped with these handlebars while riding in the aerodynamic position, or in the upright stable position, especially in situations such as descending, turning or maneuvering the bicycle around hazardous situations;

(b.) to increase the confidence of the cautious rider to ride in the aerodynamic position by giving the means, security to know that the rider can control the bicycles speed at his/her leisure.

(c.) a means to connect several brake levers to a caliper type bicycle brake that allow the aerodynamic handlebar system user the means to brake from both the aerodynamic hand position as well as in the upright stable hand position.

(d.) to increase the safety of the riders using the aerodynamic handlebar system and those people and environment around the rider by allowing the rider the ability to brake from the aerodynamic hand position as well as in the upright stable position.

(e.) to increase the efficiency of the rider by allowing the rider to remain in the aerodynamic position longer (thereby maintaining his/her speed) and allow the rider to control the bicycle through various situations such as descending, turning and maneuvering;

(f.) variability in the type of levers which could be used with this system, such as the regular road bike levers, mountain bike levers or the smaller BMX type levers;

(g.) the ability to be used with all caliper brake systems in use today;

(h.) a secure and safe multiple cable attachment means;

(i.) a responsive and efficient brake lever actuation and retraction performance;

(j.) a clean, lightweight, inconspicuous, aesthetically pleasing multiple lever brake actuation system;.

(k.) an easy to install and relatively inexpensive system to fabricate and implement.

Further objects and advantages of my invention will become apparent upon reading the following detailed description and upon reference to the drawings.

BRIEF DESCRIPTION OF THE DRAWINGS

FIG. 5 shows one of the three preferred embodiments, the Double Lever Brake System, comprised of the upper aero-position brake lever and the lower primary position brake lever, on an aerodynamic handlebar system.

FIG. 6 shows the second of the three preferred embodiments, the Double Lever Brake Barrel System, on another type of aerodynamic handlebar system.

FIG. 7 shows the third of the three preferred embodiments, the Double Lever Brake Adapter, on an aerodynamic handlebar.

REFERENCE NUMERALS IN DRAWINGS

Figure 1:
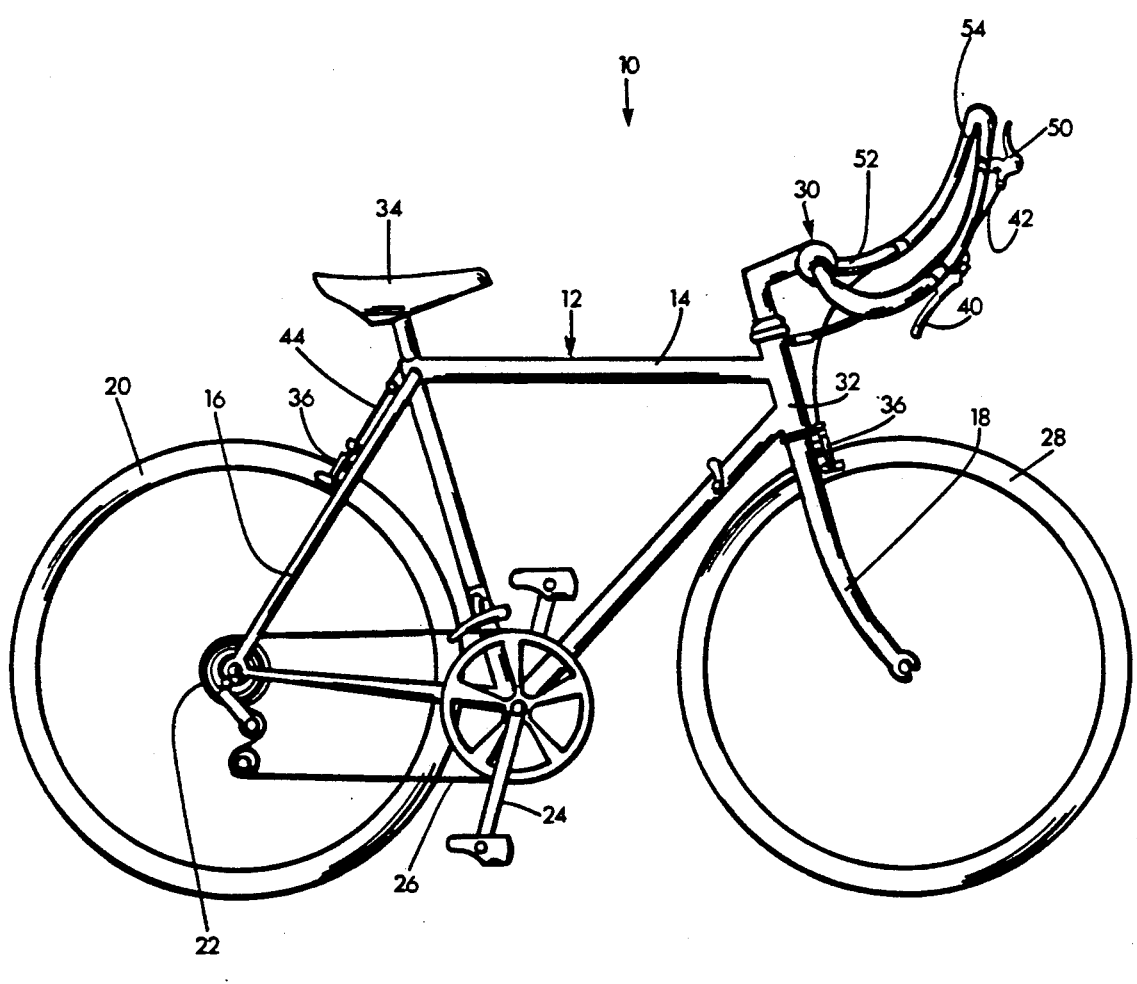
FIG. 1 shows a side view of a bicycle with an aerodynamic handlebar system with the double lever braking system, one brake lever set in the aerodynamic hand position and the other brake lever set in the upright stable hand position.

10: Bicycle
12: Frame
14: main triangle
16: rear triangle
18: forks
20: rear wheel
22: sprocket assembly
24: crank and pedal assembly
26: chain
28: front wheel
30: Aerodynamic handlebar system and stem assembly = Aerodynamic handlebar system
32: headtube
34: seat
36: brake
40: primary brake lever
42: brake cable
44: brake cable housing
46: cable stop
48: cable stop hole
50: aerodynamic position brake lever = aero-position brake lever/auxillary brake lever
52: upright stable hand position
54: aerodynamic hand position = aero-position
56: brake lever actuating arm = lever
58: cable stop lever arm
62: brake lever pivot point
70: cable slot
72: cable slot
74: cable anchor bolt
76: cable stop bushing
78: brake body
80: threaded adjusting barrel ferrule
82: rendezvous cable connector
84: Double lever barrel
86: Double lever barrel cap
88: adjusting barrel
90: Double lever brake adapter
92: modified cable clamping plate
94: bolt
96: nut
98: adjusting barrel brake hole
100: clamping plate cable slots
102: clamping plate screw
104: tandem bicycle
106: stoker
108: captain

DESCRIPTION OF INVENTION

Referring more specifically to the drawings this invention is comprised simply as two or more brake levers connected to a bicycle brake 36 by a brake cable 42 and brake cable housing 44 assembly.

A Description of a Bicycle Equipped with an Aerodynamic Handlebar System and the Double Lever Braking System FIG. 1 is one form of a human powered vehicle where multiple hand or body positions are utilized for increased riding performance. Shown in FIG. 1 is a bicycle 10 comprised of a frame 12 having a main triangle 14, a rear triangle 16, a headtube 32 and forks 18. An important feature of the bicycle 10 is a seat 34 attached to the main triangle 14 of the frame 12. The bicycle 10 is propelled in a known manner through a drive-train system consisting of a crank and pedal assembly 24, a sprocket assembly 22, a chain 26 and a rear wheel 20. A front wheel 28 is attached to the forks 18 where the forks 18 are attached to the frame 12 through the headtube 32 of the frame 10.

Also attached to the front forks 18 is a type of aerodynamic handlebar and stem assembly 30 that allows a means for the front wheel 28 to be turned to steer the bicycle 10. A set of brakes 36 attached to the rear triangle 16 and the front forks 18 contact the front and rear wheels, 28 and 20, reduce the speed of the bicycle 10 by frictional force.

A set of primary and auxiliary brake levers 40 and 50 actuate the front and rear brakes 36 through a special brake cable 42 and brake housing 44 assembly. The auxiliary set of brake levers 50, the novel feature of my invention, allow the rider to brake from auxiliary riding positions, such as the aerodynamic position of the rider shown in FIG. 2.

Figure 2:
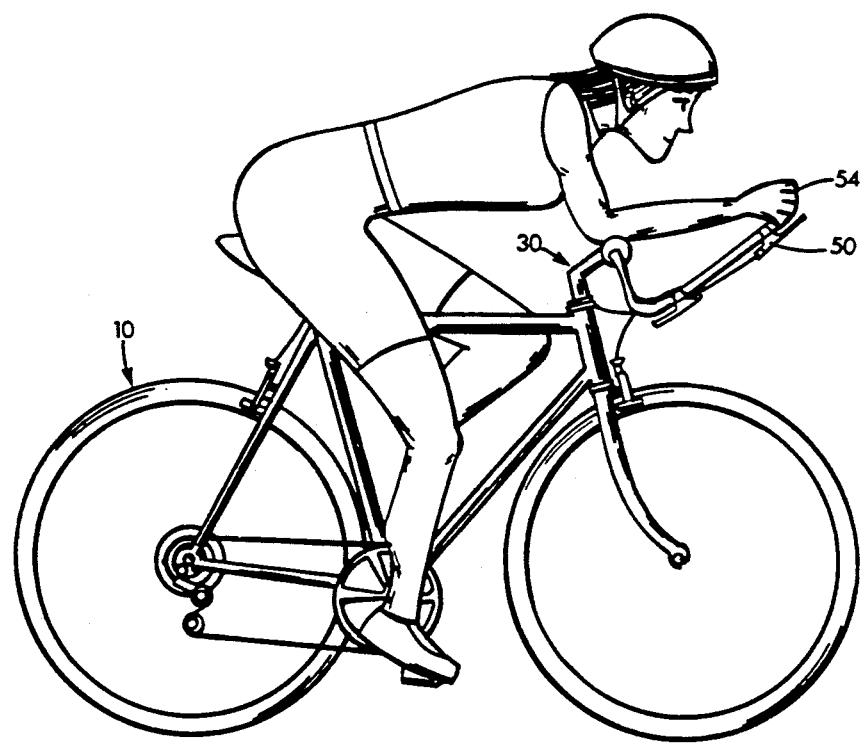
FIG. 2 shows a side view of a triathlete or cyclist the aerodynamic position of a bicycle with an aerodynamic handlebar system equipped with the double lever braking system.

Description of the Aerodynamic Handlebar System and the Double Lever Braking System FIG. 2 shows the auxiliary brake lever location, in this case, the aerodynamic hand position 54 in reference to a triathletes or cyclists riding position on a bicycle 10 with the aerodynamic handlebar system 30. Because the riders weight is over his/her elbows the rider does not have sufficient access to the bicycles typical standard braking system 50 while riding in the aero-position of the aerodynamic handlebar equipped bicycle 10.

Figure 4:
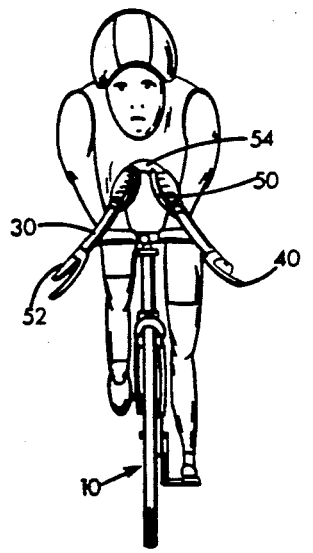
FIG. 4 the front view of a triathlete or cyclist riding in the aerodynamic position with braking capability.
Figure 3:
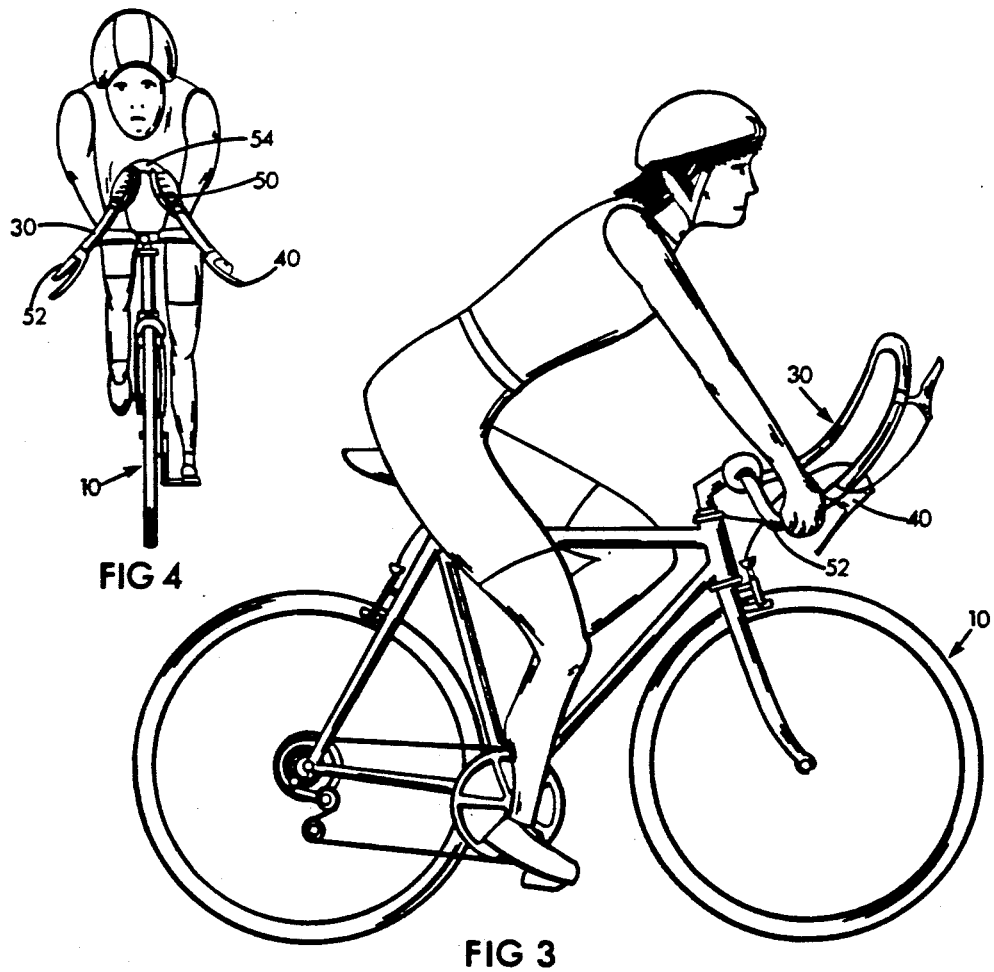
FIG. 3 shows a side view of a triathlete or cyclist riding in the upright stable position of a bicycle with an aerodynamic handlebar system equipped with the double lever braking system.

The triathlete or cyclist ride this particular human powered vehicle, the bicycle 10 with the aerodynamic handlebar system 30 in two basic positions, the upright stable hand position 52, where the riders body weight and steering control is supported by the riders hands, and the aerodynamic hand position where the riders body weight and steering control is supported by the riders elbows, as shown by FIG. 3 and FIG. 4. One set of brake levers, in this case, primary brake levers 40 are the current and standard means for reducing the bicycles 10 speed with the rider in both the upright stable position 52 and the aero-position 54.

FIGS. 5, 5A, 6, 6A, 7, 7A, 7B, show three of the preferred embodiments, the Double Lever Brake System, the Double Lever Barrel Brake System, and the Double Lever Adapter System that will allow a means for a rider to be able to actuate the bicycle 10 with the aerodynamic handlebar system 30.

Description of the First Double Lever Braking System Embodiment—The Double Lever Brake System My first preferred embodiment shown in FIG. 5, the Double Lever Brake System, is comprised of two special brake levers, the primary brake lever 40 and the aero-position brake lever 50.

The primary brake lever 40 allows for a single special brake cable 42 with a off-centered cable stop 46 to be installed due to its unique slot configuration which allow the cable stop 46 of this single brake cable 42 to be installed into the cable stop hole 48 in the cable stop lever arm 58 and the ends of the brake cable 42 to exit the primary brake lever 40 through its upper and lower cable slots, 70 and 72. These cable slots, 70 and 72 allow not only the installation of the single brake cable 42, but also allow the cable 42 to rotate when the cable stop lever arm 58 rotates which in turn pulls on the brake cable 42 that actuates the brake 36.

Another unique feature of the primary brake lever 40 is the reversed location of the brake lever pivot point 62 which allows the brake lever actuating arm 56 to actuate the brake 36. When the aero-position brake lever 50 is actuated it rotates the cable stop lever arm 58 in a counter-clockwise direction which then pulls the brake cable 42. This pulled brake cable section then pulls on the cable stop actuating arm 58 of the primary brake lever at its cable stop connection point 48. Finally the cable stop 46 in the cable stop hole 48 of the primary brake lever 40 pulls on the lower cable section 42 as it also rotates the primary brake lever actuating arm 56 in a clock-wise direction.

Cable housing 44 encasing the brake cable 42 between the primary brake lever 40 and the brake 36 is necessary for the brake 36 to be actuated by the brake cable 42.

Figure 5A:
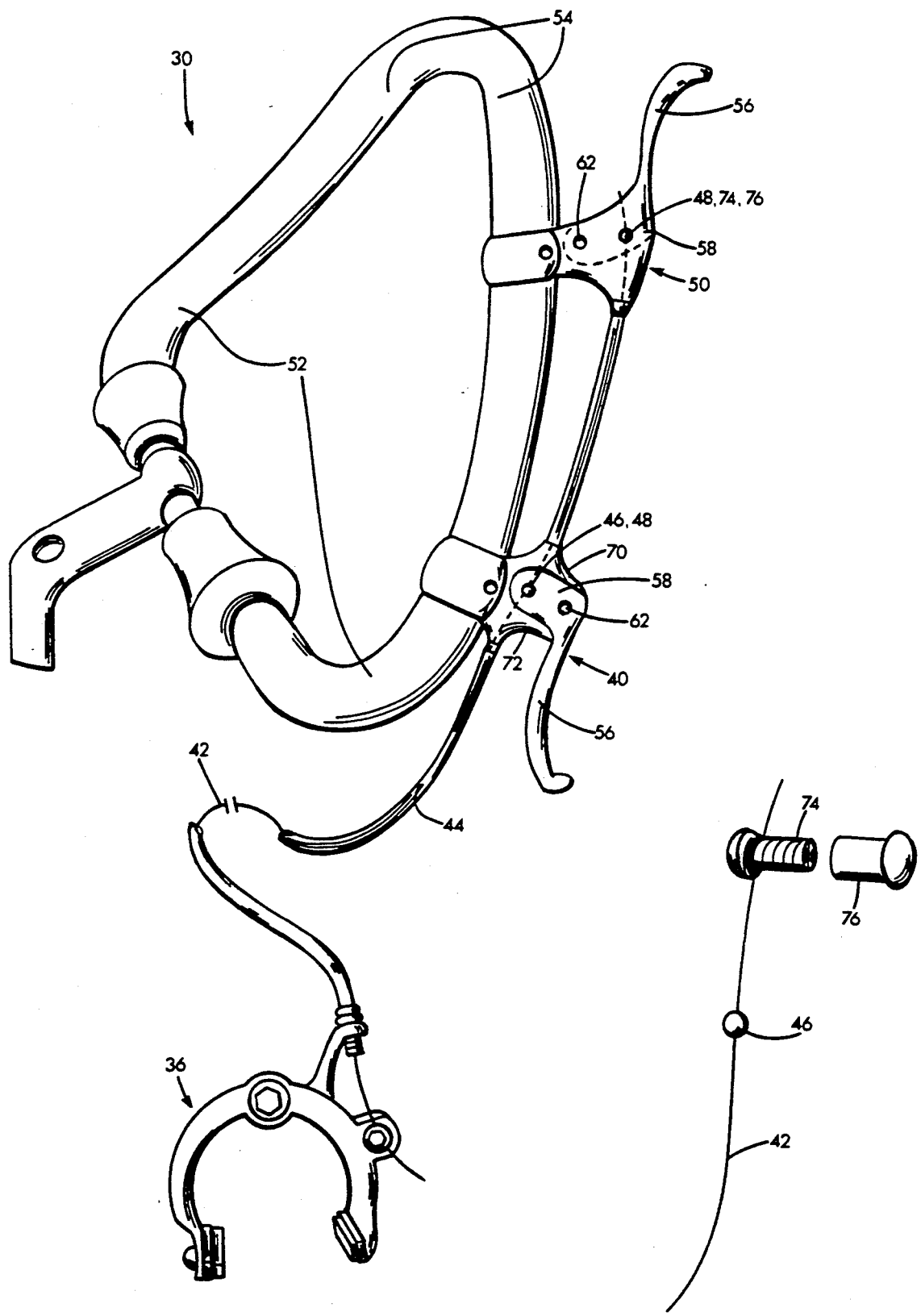
FIG. 5A shows an exploded view of critical components of the Double Lever Brake System shown in FIG. 5.

The aero-position brake lever 50 is of somewhat conventional design except for the cable connector 46, 48 assembly comprised of a cable anchor bolt 74 with a hole to fit the cable through it just below the head of this anchor bolt as shown in, FIG. 5A, which in turn fits into the tapped cable stop bushing 76. This bushing 76 fits into the enlarged cable stop hole 48 of the aero-position brake lever 50.

The other end of the brake cable 42 is fed to the brake 36 and conventionally clamped into place. The pivot point 62 of the aero-position brake lever 50 is in the conventional location and configuration of standard bicycle brake levers as well as the cable slot 70 to allow the cable 42 to rotate and attach to the aero-position brake lever 50 through the cable stop 46 and cable stop assembly hole 48. Both levers of this double lever brake system have conventional means for attaching to the aerodynamic handlebar 30 or other actuating locations of an applicable human powered vehicle.

Figure 6A:
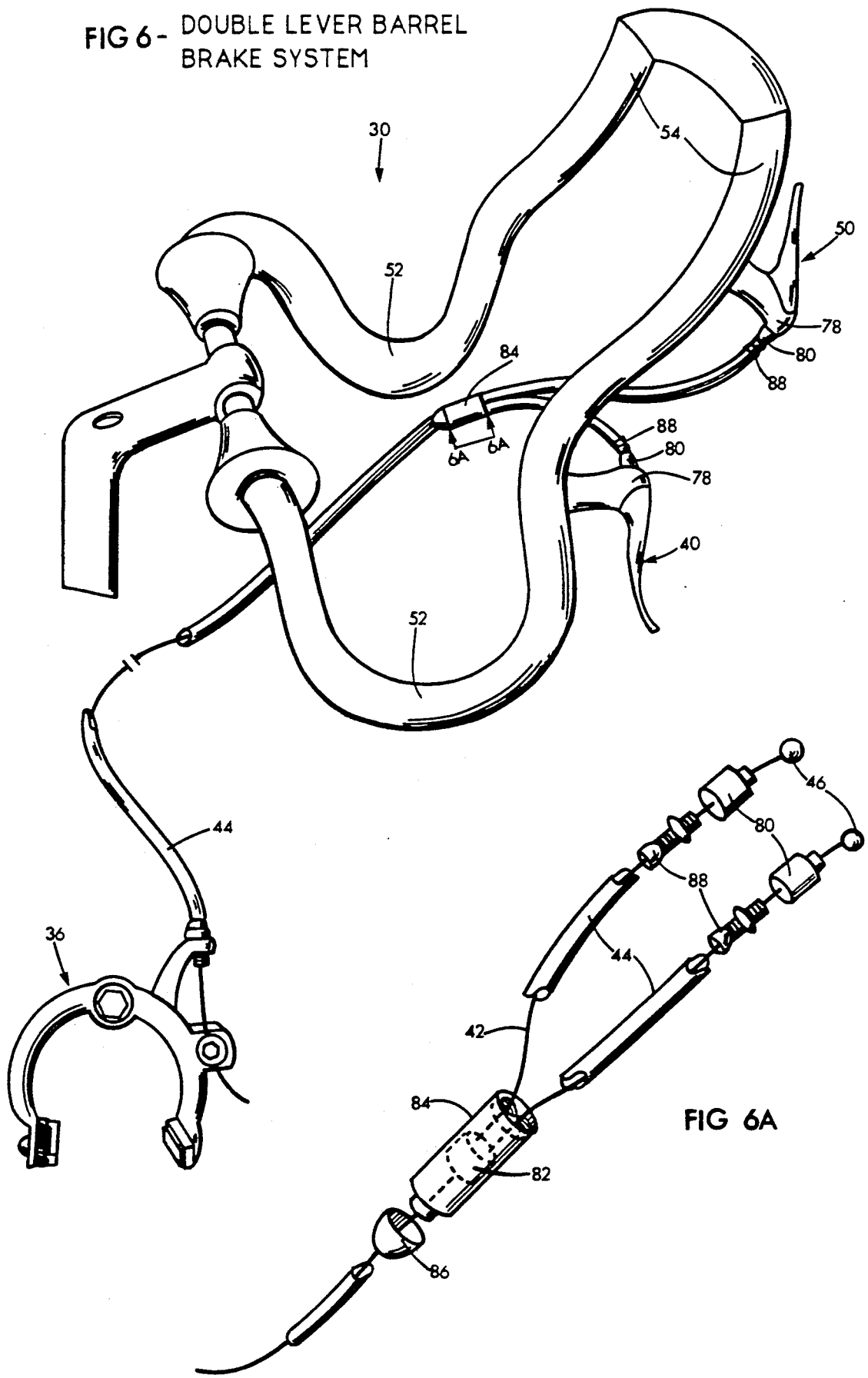
FIG. 6A shows an exploded view of critical components of the Double Lever Brake Barrel System shown in FIG. 6.
Figures 7A, 7B:
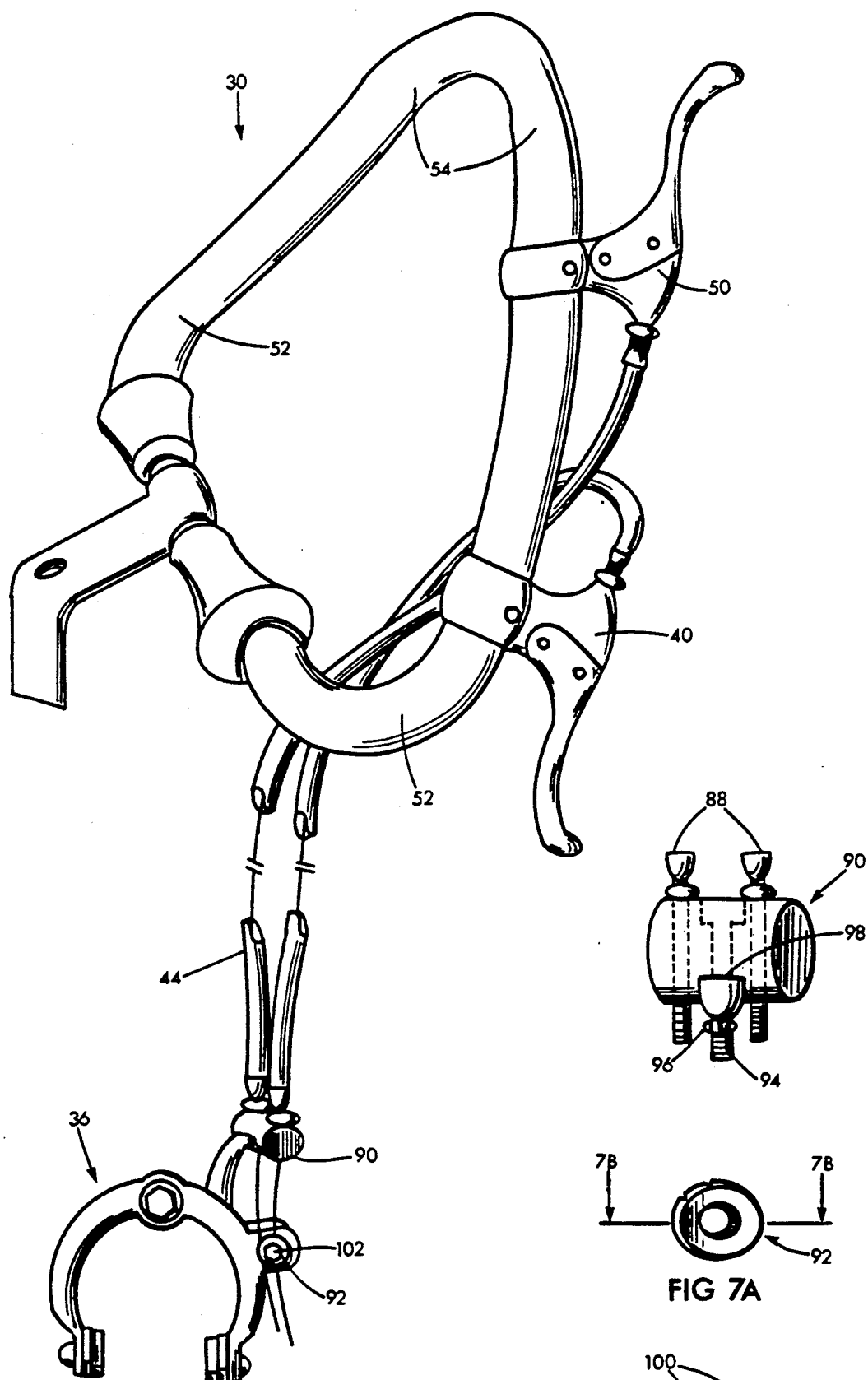
FIG. 7A shows an exploded view of the Double Lever Brake Adapter and the modified cable clamping plate.
FIG. 7B shows an exploded cross sectional view of the modified cable clamping plate.

Description of the Second Double Lever Braking System Embodiment—The Double Lever Barrel Brake System My second preferred embodiment, shown in FIG. 6, the Double Lever Brake Barrel System, is comprised of a special brake cable 2 assembly, shown in FIG. 6A, a double lever barrel 84 and barrel cap 86, a rendezvous cable connector 82, where two or more brake cables 42, which connect to the brake levers 40 and 50, are permanently connected to a single brake cable 42, that connects at the respective brake 36. Other necessary components of the double lever brake barrel system are a pair of slotted adjusting barrels 88, which interface between the double lever barrel 84 and brake cable 42 housing assemblies 44, and the brake levers 40 and 50. The slotted adjusting barrels 48 allow the adjustment and secure fit of the housing 44 to brake levers 40 and 50. Brake cable housing 44 in regards to this system is necessary between both ends of the double lever barrel assembly 84, at the corresponding brake 36 and slotted adjusting barrels 88 for brake actuation to take place. Slotted, threaded adjusting barrel ferrules 80 allow the use of the adjusting barrels 88 on road bike brake levers or other lever that don't already have a tapped, adjusting barrel fitted body 78. Spherical cable stops 46 allow the brake cables to attach to conventional road bike brake levers, mountain bike brake levers and BMX brake levers. Actuation of any or a combination of brake levers 40 and 50 will pull on the rendezvous cable connector 82 which in turn pulls on the single brake cable 42 that actuates the brake 36. This cable system works on applications where the brake lever locations are in close proximity of each other and the brake cables 42 exiting the brake lever 40 and 50 leading to the brake 36 are in the same approximate direction. This design provides a clean looking system and allows for adjustment of each lever 40 and 50 to ensure a tight cable 42 fit.

Description of the Third Double Lever Braking System Embodiment—the Double Lever Brake Adapter System The third embodiment of my double lever brake system, the double lever adapter system, is the simplest system of the three embodiments to fabricate and install, however this crude yet basic system, which routes the two separate brake cables 42 and housing 44 assemblies to the respective brake 36, allows each lever to be individually adjusted to the brake 36. The critical component of this assembly is the double lever adapter 90 shown in FIG. 7A. This Double lever adapter 90 wit two adjusting barrels 88, a bolt 94 and nut 96 attach this double lever brake adapter 90 to the brake 36 through the adjusting barrel hole 98 in the brake 36. Any bicycle brake lever can be easily used with this system and any lever location or lever configuration will work with this double lever brake adapter 90. The two brake cables 42 that connect the brake levers 40 and 50 are attached to the brake 36 with a modified cable clamping plate 92. This modified clamping plate 92 with two clamping plate cable slots 100 on either side of the clamping plate screw 102 balances the load on the connected cables 42 ensure a safe securement of the cables 42 and that no cable 42 slippage occurs. Furthermore adjustment of either brake lever 40 and 50 is possible with the corresponding adjusting barrel 88.

Other Possible Applications of the Double Lever Braking System

This double lever braking system can be used on any human powered vehicle where extreme multiple riding positions are desired.

Figure 8:
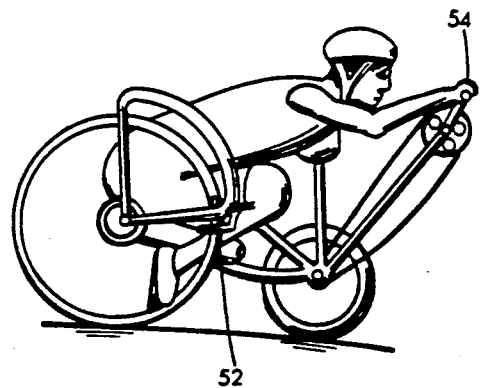
FIG. 8 shows another application of the Double Lever Braking system, a physically impaired athlete or a human powered vehicle rider racing on a high performance racing wheelchair or type of human powered vehicle with multiple riding positions for high performance output that allow braking capabilities from each position.
Figure 8A:
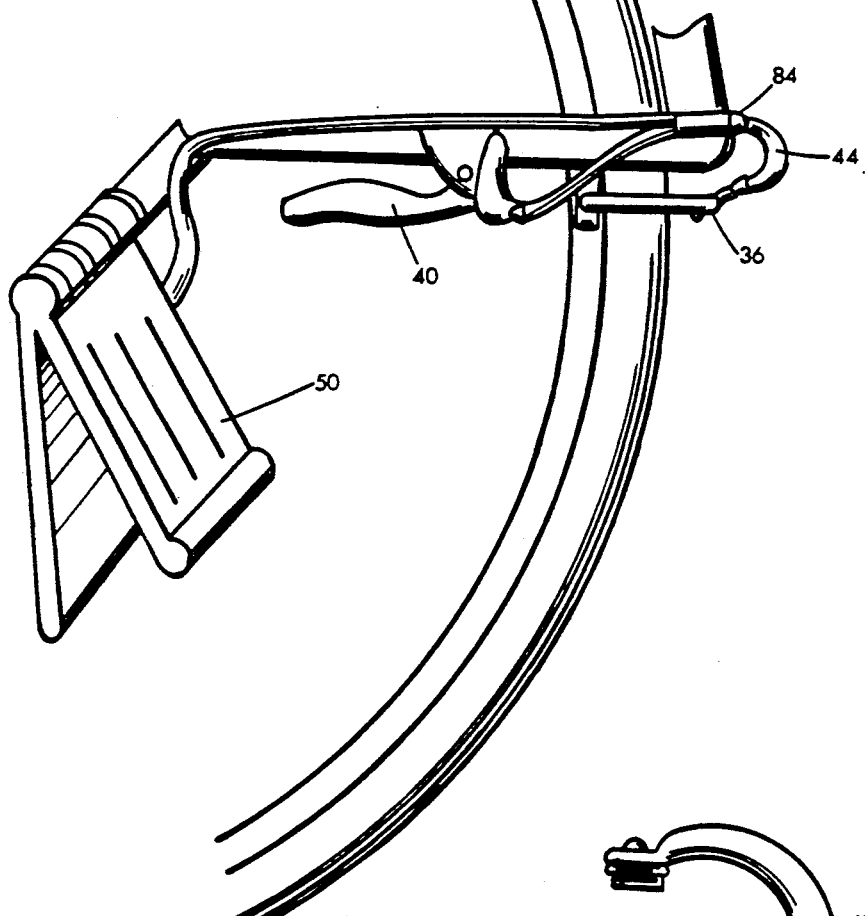
FIG. 8A is an exploded view of the Double Lever Brake Barrel system on the human powered vehicle shown in FIG. 8.
Figure 8B:
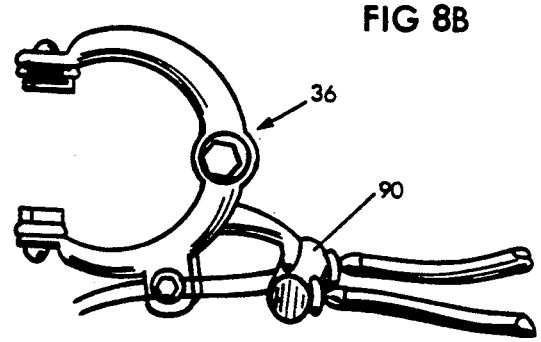
FIG. 8B is an alternative embodiment, the Double Lever Brake Adapter that could be used on the human powered vehicle shown in FIG. 8.
Figure 9:
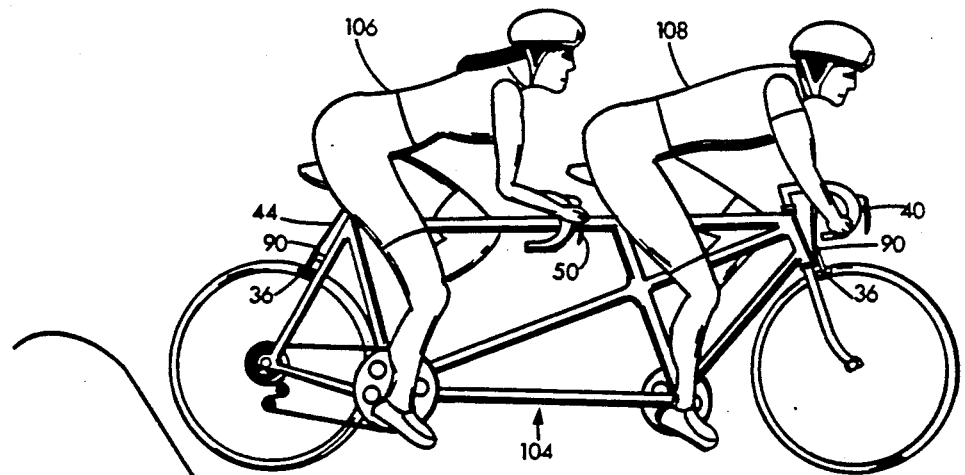
FIG. 9 shows yet another applicat Lever Braking System, a tandem bicycle with two sets of functioning brake levers, one on the captains handlebars and one on the stoker handlebars.

Some possible applications of the described embodiments are shown in FIGS. 8 and 9. FIG. 8 is a model of a human powered vehicle such as a high performance racing wheelchair or HPV where multiple riding positions exist 52 and 54. FIG. 8A shows how the double lever barrel system connects the foot lever 50 and hand lever 40 to the brake 36. FIG. 8B shows how the double lever brake adapter system can also be implemented with this HPV application.

Figure 9A:
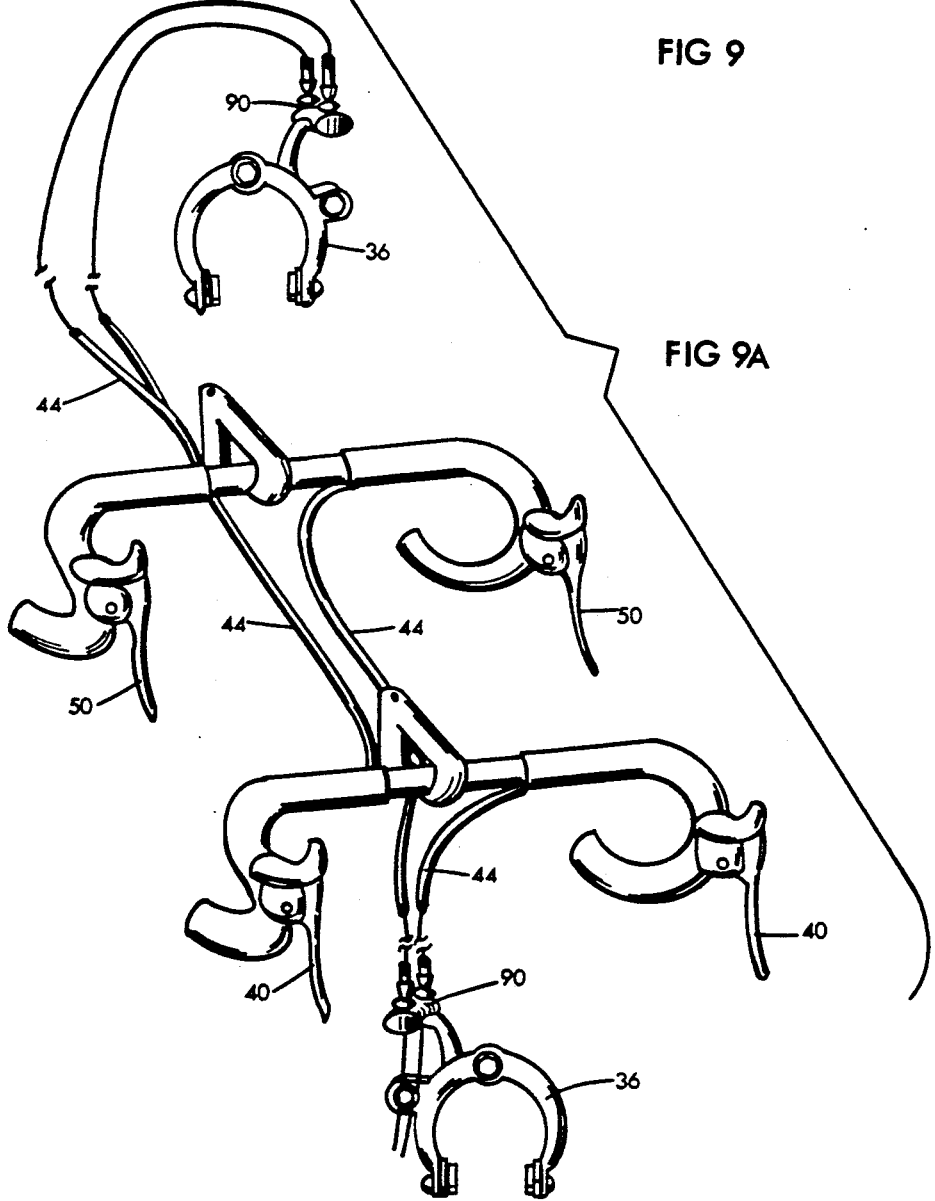
FIG. 9A shows an exploded view of the tandem handlebars witn brake levers, the right levers of each handlebar going to the rear brake and the left levers of each handlebar going to the front brake.

Another desirable application of the double lever braking system is shown in FIG. 9. Currently, a tandem bicycle 104 has only one functioning set of brakes 36 and only one corresponding set of brake levers 40 to actuate the brakes 36 Unfortunately, only the captain 108 or most forward rider has access to the brake levers 40 unless a whole entire auxiliary brake system, such as a disc brake (needed for heavier riders) is installed on the tandem bicycle 104. The stoker 106, rear rider has no control in this type of human powered vehicle speed. FIG. 9A shows how the two separate sets of brake levers primary 40 and auxiliary 50 tie into the respective brakes 36 with the aid of the double lever brake adapter 90. With this multi-actuating braking system, the stoker rider 106 can also independently reduce the tandems 104 speed or concurrently apply more pulling force on the corresponding brake 36 used by the captain 108.

Conclusion, Summary and Ramifications

While each embodiment produces the same result, brake actuation from various hand or foot positions on a human powered vehicle, each double lever braking system described above applies more efficiently to different human powered vehicle types due to the vehicles overall configuration, distance between each actuator, and the distance between the brake and actuators Therefore, it is to be understood that other embodiments or vehicle applications of the present invention is not limited to those in my above description. Since numerous modifications and changes can readily occur to those skilled in the art, it is not desired to limit the invention to the exact construction, application, and operation shown and described, and accordingly, all suitable modifications and equivalents may be resorted to falling within the scope of the invention.

The reader can now see that the double lever braking system provides a means for triathletes, cyclists or riders the ability to ride safely in the aero-position. The rider can now control a bicycles speed in any situation. Furthermore this double lever braking system allows aggressive riders to ride more safely and at least have a brake lever nearby as he/she descends down a steep, windy road in the aero-position, that can control the bicycles speed.

This double lever braking system does provide a needed, new and unexpected result, . . . Imagine the triathlete or cyclist described above pedaling full speed down that steep, windy road to the finish line, staying in the aero-position, . . . and coming, suddenly to a complete stop, still in the aero-position. Prior to my invention being implemented most people would be running out of this "out of control" triathletes way. (Because currently no complete actuating system exists in the aero-position.)

I foresee, once this double lever braking system is realized by the general public, race directors and ride coordinators will require the all people using aerodynamic handlebar systems to have a means to control their bike while riding in the aero- 0 position. Fewer bicycle accidents will occur associated with the use of these aerodynamic handlebar systems due to the implementation of this new and needed double lever braking system.

I claim:

1. A double brake lever brake actuation system for a bicycle equipped with an aerodynamic type handlebar assembly having at least two riding hand positions, an upright stable riding hand position on a first portion of said handlebar assembly and a forward aerodynamic riding hand position on a second portion of said handlebar assembly, comprising:
- (a.) a rear bicycle brake mounted on a rear triangle of said bicycle, which includes a pair of brake pads which are engaged on a rim of a rear wheel of said bicycle which rear wheel is located between each said brake pad to reduce the speed or stop said bicycle,
- (b.) two brake levers, one including a primary brake lever located on the upright stable riding hand position on said first portion of said handlebar assembly and one secondary brake lever located on the forward aerodynamic riding hand position on said second portion of said handlebar assembly, which said primary and secondary levers allow a bicycle rider to actuate said bicycle brake while remaining in said aerodymaic riding hand position as well as in said upright stable riding hand position,
- (c.) the brake actuation system comprising:
  - (c1.) two brake cable and housing assemblies each connected to one end of said brake cable and housing assemblies to a corresponding one of said primary and secondary brake levers,
  - (c2.) a single brake cable and housing assembly connected at one end thereof to said rear bicycle brake,
  - (c3.) a rendezvous cable connector which connects said two brake cable and housing assemblies ends not connected to said primary and secondary brake levers to said single brake cable and housing assembly end not connected to said rear bicycle brake,
  - (c4.) a double lever barrel that houses the rendezvous cable conenctor whereby said double lever barrel acts as an interface between said brake cable and housing assemblies going into said double lever barrel and said single brake cable and housing assembly going out of said double lever barrel which allow brake actuation from each said primary and secondary brake levers or combination of said brake levers thereby allowing rear brake actuation from each of said riding hand positions,
- (d.) individual brake lever adjustment means for each said primary and secondary brake levers tos aid rear bicycle brake comprising adjusting barrel assemblies to compensate for wear each adjusting barrel assembly being located between each said primary and secondary brake levers and said double lever barrel, which allow responsive brake actuation and ensure a tight fit between said respective brake levers, brake cable and housing assemblies and said bicycle brake.

2. The double brake lever brake actuation system of claim 1 wherein said aerodynamic type handlebar assembly is a triathlete handlebar or a type of bicycle handlebar with an aerodynamic type clamped on bar attachment.

3. The double brake lever brake actuation system of claim 1 wherein said rendezvous cable connector is cylindrically shaped which fits inside said double lever barrel whereby said rendezvous cable connector is freely rotatable inside said body.

4. The double lever brake actuation system of claim 1 further comprises an additional set of primary and secondary brake levers located at separate portions of said handlebar assembly on an opposite side of said aerodynamic type handlebar assembly for upright stable riding as well as for forward aerodynamic riding, another brake actuation system and individual brake lever adjustment system for connection of said additional two respective brake levers to a front brake, mounted on a front fork of said bicycle, which when actuated engages a set of brake pads on a rim of a front wheel of said bicycle.

* * * * *